United States Patent
Epskamp et al.

(10) Patent No.: US 12,255,517 B2
(45) Date of Patent: Mar. 18, 2025

(54) ELECTRIC MOTOR HAVING ELECTROMAGNETICALLY ACTUATABLE BRAKE

(71) Applicant: SEW-EURODRIVE GMBH & CO. KG, Bruchsal (DE)

(72) Inventors: Torsten Epskamp, Bretten (DE); Gerolf Fichtner-Pflaum, Kraichtal-Unteröwisheim (DE); Alexander Stahl, Karlsruhe (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 272 days.

(21) Appl. No.: 18/025,670

(22) PCT Filed: Sep. 2, 2021

(86) PCT No.: PCT/EP2021/074308
§ 371 (c)(1),
(2) Date: Mar. 10, 2023

(87) PCT Pub. No.: WO2022/053398
PCT Pub. Date: Mar. 17, 2022

(65) Prior Publication Data
US 2023/0344305 A1    Oct. 26, 2023

(30) Foreign Application Priority Data
Sep. 10, 2020    (DE) .......................... 102020005540.0

(51) Int. Cl.
*H02K 7/102*    (2006.01)
*H02K 7/12*    (2006.01)

(52) U.S. Cl.
CPC .................. *H02K 7/1023* (2013.01)

(58) Field of Classification Search
CPC ......... H02K 7/1025; H02K 7/12; H02K 7/102
(Continued)

(56) References Cited

U.S. PATENT DOCUMENTS

| 2,860,748 A | 11/1958 | Turner et al. |
| 4,135,612 A | 1/1979 | Lengsfeld |

(Continued)

FOREIGN PATENT DOCUMENTS

| DE | 1030121 B | 5/1958 |
| DE | 102012019415 A1 | 4/2014 |

(Continued)

OTHER PUBLICATIONS

International Report on Patentability issued in corresponding International Application No. PCT/EP2021/074308 dated Mar. 7, 2023, pp. 1-7, English Translation.

(Continued)

*Primary Examiner* — Jose A Gonzalez Quinones
(74) *Attorney, Agent, or Firm* — Carter, DeLuca & Farrell LLP

(57) ABSTRACT

In an electric motor having electromagnetically actuatable brake, the brake has a coil received in a magnet body. A brake lining carrier is connected, rotation-fast but axially displaceable, to a rotor shaft of the electric motor, and an armature disk is connected, rotation-fast but axially displaceable, to the magnet body. The armature disk is arranged axially between the brake lining carrier and the magnet body. Springs supported on the magnet body press on the armature disk. A second electromagnet is arranged on the magnet body. A lever is pivotably mounted relative to and/or on the magnet body. The lever is connected to the armature disk, such that in a first rotational position of the lever, the armature disk is pressed towards the brake lining carrier, and in a second rotational position of the lever, the armature disk is kept pulled towards the magnet body.

20 Claims, 6 Drawing Sheets

(58) Field of Classification Search
USPC .............................................. 310/77, 78, 93
See application file for complete search history.

(56) References Cited

U.S. PATENT DOCUMENTS

| | | | | |
|---|---|---|---|---|
| 5,685,398 | A | * | 11/1997 | Marshall ................ F16D 59/02 |
| | | | | 188/196 R |
| 6,125,975 | A | * | 10/2000 | Seeto ...................... F16D 55/28 |
| | | | | 188/72.3 |
| 2015/0292580 | A1 | * | 10/2015 | Fichtner-Pflaum ..... F16D 65/18 |
| | | | | 188/161 |

FOREIGN PATENT DOCUMENTS

| | | |
|---|---|---|
| DE | 102013019615 A1 | 5/2014 |
| DE | 102013006605 A1 | 10/2014 |
| DE | 102013016999 A1 | 4/2015 |
| DE | 102017000845 A1 | 8/2018 |
| EP | 2493058 A1 * | 8/2012 ............ H02K 7/102 |

OTHER PUBLICATIONS

International Search Report issued in corresponding International Application No. PCT/EP2021/074308 dated Nov. 22, 2021, pp. 1-2, English Translation.

* cited by examiner

ELECTRIC MOTOR HAVING ELECTROMAGNETICALLY ACTUATABLE BRAKE

FIELD OF THE INVENTION

The present invention relates to an electric motor having an electromagnetically actuatable brake.

BACKGROUND INFORMATION

An electric motor having an electromagnetically actuatable brake is described in German Patent Document No. 10 2012 019 415.

A brake arrangement is described in German Patent Document No. 10 2013 016 999.

An electric motor having a brake arrangement is described in German Patent Document No. 10 2013 006 605.

An electric motor having a brake arrangement is described in German Patent Document No. 10 2013 019 615.

An electric motor having an electromagnetically actuatable brake arrangement for braking a shaft is described in German Patent Document No. 10 2017 000 845.

SUMMARY

Example embodiments of the present invention provide an electric motor, in which resources may be saved.

According to an example embodiment of the present invention, in an electric motor having an electromagnetically actuatable brake, the brake has a coil received in a magnet body. A brake lining carrier is connected, rotation-fast but axially displaceable, to a rotor shaft of the electric motor and an armature disk is connected, rotation-fast but axially displaceable, to the magnet body. The armature disk is arranged axially between the brake lining carrier and the magnet body. Spring supported on the magnet body press onto the armature disk. A second electromagnet is arranged on the magnet body, and a lever is pivotably, e.g., rotatably, mounted relative to and/or on the magnet body. The lever is connected to the armature disk, e.g., by a rod, such that in a first rotational position of the lever the armature disk is pressed towards the brake lining carrier, e.g., such that the brake is engaged, and in a second rotational position of the lever, e.g., different from the first rotational position, the armature disk is kept pulled towards the magnet body, e.g., such that the brake is released.

Thus, the armature disk is lifted from the brake lining carrier, that is, the brake is released, by the second electromagnet and a force of corresponding size generated by the lever. The second electromagnet thus supports the first electromagnet that is formed from the coil and the magnet body and that, when the coil is energized, also presses the armature disk away from the brake lining carrier, e.g., against the spring force generated by springs supported on the magnet body. In this manner, on the one hand, rapid release of the brake is made possible, and, on the other hand, after this release the released state can be maintained with less current. The coil and the electric motor, that is, for example the winding of the electric motor, are connected in parallel so that energization occurs simultaneously. Series connection, instead of parallel connection, is also made possible. For example, the amount of current is reduced due to the impedances connected in series, that is, the impedance of the coil and of the winding, e.g., when the supply voltage is the same as in the parallel connection. Due to the lower current consumption, large quantities of energy can be saved when the release of the brake is maintained for a long duration, that is, resources can be saved and thus the environment can be protected.

According to example embodiments, the lever is arranged on the side of the magnet body facing away from the armature disk. Thus, the brake can still be arranged on the motor.

According to example embodiments, the air space between lever and a coil core of the second electromagnet disappears when the second electromagnet is energized with electrical current, or is smaller than the air space between lever and the coil core of the second electric magnet when the second electromagnet is without current. Thus, the second electromagnet pulls the lever when the second electromagnet is energized. When the second electromagnet is not energized, the lever is pivoted back by the spring part so that the air space between the lever and the second electromagnet is enlarged. When the second electromagnet is energized, on the other hand, the lever is pulled towards the coil core of the second electromagnet and thus the air space is reduced or even disappears altogether.

According to example embodiments, the lever is rotatably mounted by a support, e.g., by a roller attached directly or indirectly to the magnet body, or by a cylindrical pin, and the support is arranged on the magnet body, e.g., on the outside of the magnet body. Thus, the lever is held on the magnet body and is nevertheless rotatable. For example, support of the lever on the roller or cylinder pin can be readily provided.

According to example embodiments, the lever is held in the second rotational position by the second electromagnet, e.g., when the second electromagnet is energized with electrical current. Thus, only a small amount of current is necessary if there are a large number of windings in the winding of the second electromagnet and thus a sufficiently strong magnetic field can be generated. In addition, a small pulling force of the second electromagnet can be converted via the lever action to a greater force that acts on the armature disk. To this end, the distance between the support of the lever and the second electromagnet is greater than the distance between the support and the connection region between the rod and the lever.

According to example embodiments, an end plate of the electric motor is connected to the magnet body, e.g., securely, e.g., rotation-fast and secured axially. In the first rotational position of the lever, the brake lining carrier is pressed towards a brake surface, e.g., a finely machined surface, arranged on the end plate, e.g., with the brake lining of the brake lining carrier facing the end plate. Thus, the brake lining carrier is pressed, that is a friction contact is created, or not, depending on the rotational position of the lever.

According to example embodiments, a housing part of the electric motor that surrounds the stator winding is arranged between the end plate and a further end plate. Thus, the motor is readily constructed in a cost-effective manner.

According to example embodiments, a bearing for rotatably mounting the rotor shaft of the electric motor is received in the end plate. Thus, the bearing can be readily received in a secure manner.

According to example embodiments, the relative radial distance region from the second electromagnet to the rotational axis of the rotor shaft is arranged radially outside the radial distance region covered by the magnet body. Thus, a large lever action can be attained. Thus, the brake can be released with a low holding current.

According to example embodiments, a spring part supported on the magnet body presses on the lever, e.g., on the side of the support of the lever facing away from the second electromagnet. Thus, a restoring torque can be readily generated in a cost effective manner. Alternatively, the spring part is arranged as a tension spring that pulls the lever towards the magnet body.

According to example embodiments, the lever, armature disk, and magnet body is or are made of ferromagnetic material. Thus, the pulling force can be determined by the selection of material.

According to example embodiments, the brake lining carrier has a brake lining axially on each of the two sides. Thus, an improved frictional effect can be attained.

According to example embodiments, the rod is securely connected to the armature disk, the rod projects through a recess passing through the magnet body, the rod is connected to a limiting device, e.g., to a nut screwed onto a threaded region of the rod, and is limited axially by the lever. Thus, the second electromagnet acts in a supporting manner, e.g., the holding current for continuous release, and thus also the associated power dissipation, e.g., ohmic loss, can be reduced.

According to example embodiments, the rod has projects through a recess of the lever and the limiting device is connected to the lever on the side of the lever facing away from the armature disk, e.g., is connected by a screw connection. Thus, release of the brake can be supported by the lever. The lever is disposed on the side of the magnet body facing away from the armature disk. Support of the release by the lever is provided enabled by the rod projecting through a recess passing through the magnet body.

According to example embodiments, a depression in which the lever can be received is formed on the magnet body, e.g., on the side of the magnet body facing away from the armature disk, e.g., such that the lever, e.g., the long arm of the lever, can be pulled by the magnetic leakage flux that escapes from the magnet body via the wall thickness of the magnet body that is thinned by the depression. Thus, via the thinning in the wall thickness, which is caused by the depression on the magnet body, an increased leakage flux escapes which then pulls the long arm of the lever.

According to example embodiments, a thickening is formed on the lever and is arranged as a pivot bearing for the lever, and, for example, the thickening is arranged between a long lever arm and a short lever arm. Thus, a small number of parts may be utilized in a cost-effective manner.

Further features and aspects of example embodiments of the present invention are explained in greater detail below with reference to the appended schematic Figures.

DETAILED DESCRIPTION

Figure 1:
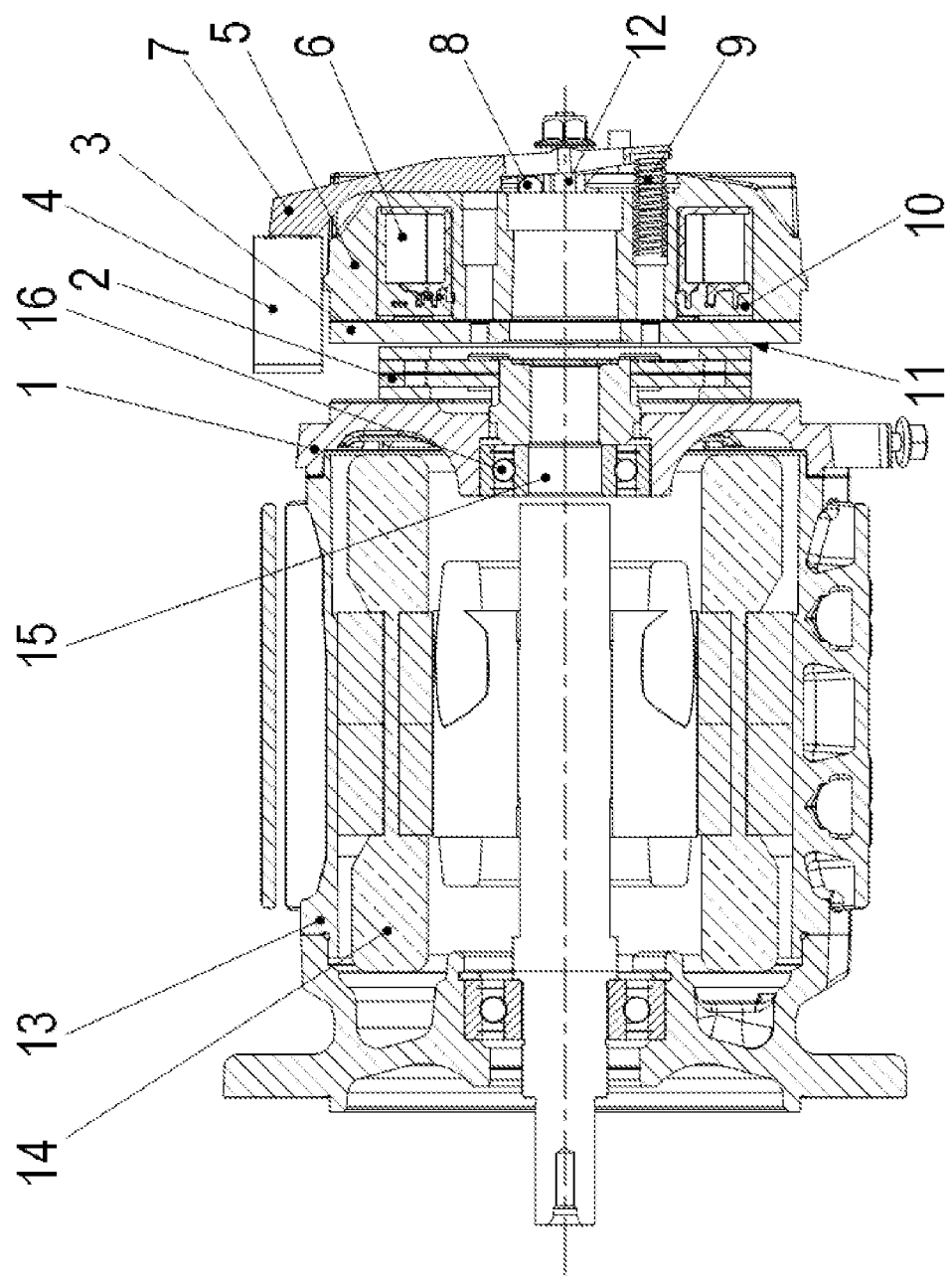
FIG. 1 is a longitudinal cross-sectional view through an electric motor with a released brake.

As illustrated in FIG. 1, the electric motor has an electromagnetically actuatable brake.

A rotor shaft 15 of the electric motor is rotatably mounted via a support 16 received in an end plate 1.

The end plate 1 is connected by screws to a housing part 13 surrounding the stator winding 14 of the electric motor. A further support of the rotor shaft 15 is received in a further end plate that is also connected to the housing part 13. The housing part 13 is arranged axially between the two end plates.

A brake lining carrier 2 is connected rotation-fast, but axially movable, to the rotor shaft 15. To this end, the brake lining carrier 2 has inner teeth fitted to outer teeth of the rotor shaft 15 or of a driver ring connected rotation-fast to the rotor shaft 15, e.g., by a feather key connection.

The brake lining carrier 2 has a brake lining axially on each side.

An armature disk 3 is connected rotation-fast, but axially movable, to a magnet body 5. The armature disk 3 is, for example, made of a ferromagnetic material.

An annular depression in which a coil 6 received in a coil bobbin 10 is received is provided in the magnet body 5 on the side of the magnet body 5 facing the stator. The annular axis of the annular depression is oriented coaxially, that is, identically, to the rotational axis of the rotor shaft, that is, e.g., axially.

The magnet body 5 is produced from a ferromagnetic material.

The brake lining carrier 2 is arranged axially between the end plate 1 and the magnet body 5.

When the depression coil 6 is energized, the armature disk 3 is pressed towards the magnet body 5 against the springs supported on the magnet body 5 that press on the armature disk 3. Thus, the brake is released, since the air gap 11 illustrated in FIG. 1 is formed.

Figure 2:
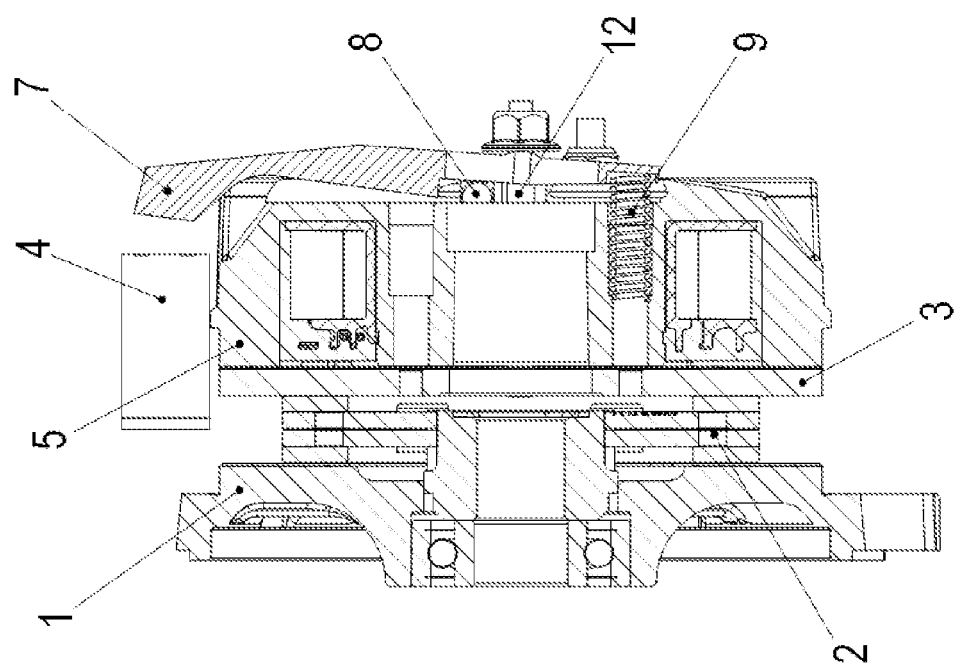
FIG. 2 is a cross-sectional view illustrating the brake engaged.

As illustrated in FIG. 2, when the coil 6 is not energized, the armature disk 3 is pressed away from the magnet body 5 by the springs supported on the magnet body 5 that press on the armature disk 3. Thus, the brake lining arranged on the brake lining carrier 2 facing the armature disk 3 comes into frictional contact with the armature disk and the brake lining of the brake lining carrier 2 facing the end plate 1 comes into frictional contact with a braking surface embodied on the end plate 1. The brake is thus engaged.

A lever 7 rotatably mounted on the magnet body 5 via a pivot bearing 9 constitutes one short lever arm and one long lever arm, e.g., in one piece, e.g., integral. A rod 12 attached to the armature disk 3 is guided through a recess in the short lever arm and, on the side of the short lever arm facing away from the electric motor, e.g., from the end plate 1, a nut is screwed onto a threaded region of the rod or a further widening of the rod is implemented. Thus, the lever 7 is axially limited by the widening or the nut.

A second electromagnet 4 is arranged at a circumferential point, e.g., vertically over the brake, radially outside of the magnet body 5 and, when energized, pulls the long lever arm towards itself.

The lever 7 is, for example, produced from a ferromagnetic material, e.g., steel.

Figure 3:
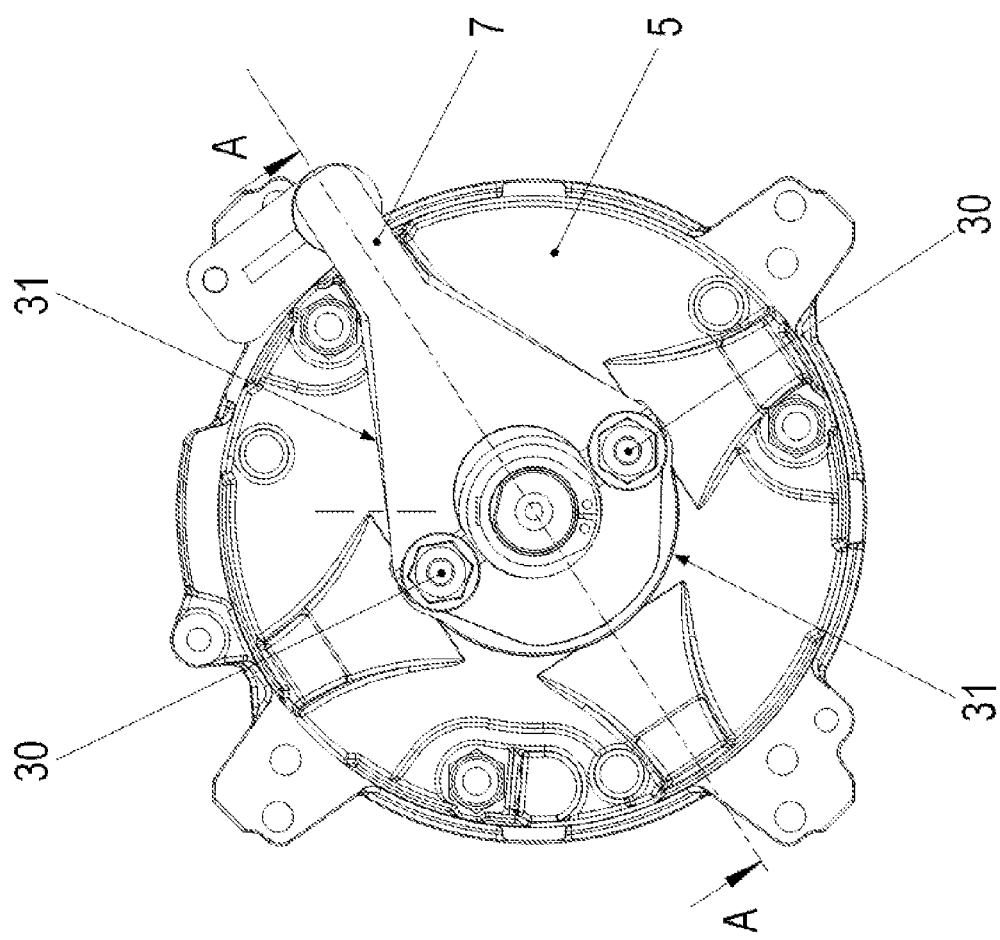
FIG. 3 is a top view in the axial direction, that is, in the direction of the rotor shaft of the electric motor.

As illustrated in FIG. 3 in combination with FIG. 1, the radial distance region relative to the rotational axis of the rotor shaft and covered by the lever 7 overlaps with the radial distance region covered by the second electromagnet 4.

When the second electromagnet 4 is energized, the lever 7 is pulled towards the second electromagnet 4 against the spring force generated by the springs pressing against the armature disk, e.g., because the coil 6 is also energized and thus the armature disk is pulled towards the magnet body 5. The pulling forces of both electromagnets thus act together such that the armature disk 3 is pulled towards the magnet body 5 and the long lever arm of the lever 7 is pulled towards the second electromagnet. Likewise, supporting this movement, the spring part 9 supported on the magnet body 5 presses the short lever arm of the lever 7 so that the long lever arm is pressed towards the magnet body 5 and also towards the second electric magnet 4. A particularly thin-walled configuration of the magnet body 5 in the region of the long lever arm further supports this movement, since thus a portion of the magnetic field generated by the coil 6 escapes from the magnet body 5 and pulls the long lever arm of the lever 7.

When the second electromagnet 4 is not energized, the lever 7 is pulled away from the second electromagnet 4 by the spring force generated by the springs pressing on the armature disk 3 and supported on the magnet body 5, because the armature disk pulls back the lever 7 by the rod 12 and the widening, e.g., the nut. The spring force generated by the spring part 9 is weaker than the spring force generated by the springs. The spring part 9 is arranged on the side of the support 8 facing away from the second electromagnet.

The lever 7 projects into a depression that is formed on the magnet body 5, e.g., that reduces the wall thickness of the magnet body 5 in the region between the lever 7 and the coil 6.

The support 8 may be arranged as a round bolt that extends perpendicular to the direction of the lever. Thus, the direction of the bolt is oriented perpendicular to the pivot plane of the lever 7.

The winding axis of the coil 6 is coaxial with the rotational axis of the rotor shaft 15.

When the second electromagnet 4 is energized, the lever 7 is, e.g., pulled into close proximity with or up to touching a coil core of the second electromagnet 4.

The support 8 is arranged radially inside of the radial distance region covered by the coil 6, relative to the rotor shaft.

The magnetic pole of the coil 6 generated by the coil 6 and facing the lever 7 is magnetized in the same manner as the magnetic pole of the second electromagnet 4 generated by the second electromagnet 4 and facing the lever 7. In this manner, the lever 7 is pulled both by the second electromagnet 4 and by the leakage flux escaping from the magnet body 5, e.g., which still escapes from the side of the magnet body 5 facing away from the end plate 1 despite the pot-shaped configuration of the magnet body 5.

The second electromagnet 4 and the coil 6 are electrically connected in series, so that both are energized at the same time. In this manner, they mutually support one another when the brake is released. This is because the ferromagnetic armature disk 3 is pulled directly by the coil 6 and the lever 7 is pulled by the second electromagnet 4 such that the former executes a pivot movement that also pulls the armature disk 3 towards the magnet 5 by the rod 12.

The pivot movement is caused in that the lever 7 is disposed on the pivot bearing 9, e.g., the pin, and thus only the long lever arm is pulled towards the second electromagnet 4. In addition, the spring part 9 presses on the short lever arm of the lever 7 so that the pivot movement is supported.

Thus, when the brake is first released, the coil 6 and the second electromagnet 4 act together. If the armature disk has reached its axial position adjacent to the magnet body 5, it is only necessary for the armature disk 3 to be held in this position.

Figure 4:
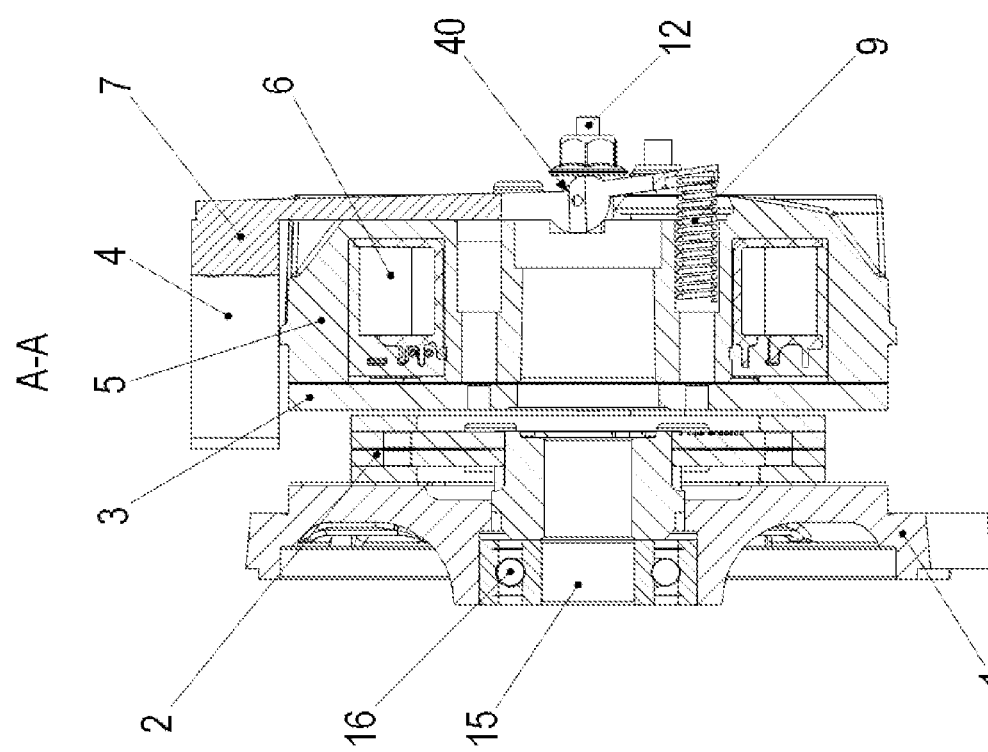
FIG. 4 is a cross-sectional view of a released brake of an electric motor.
Figure 5:
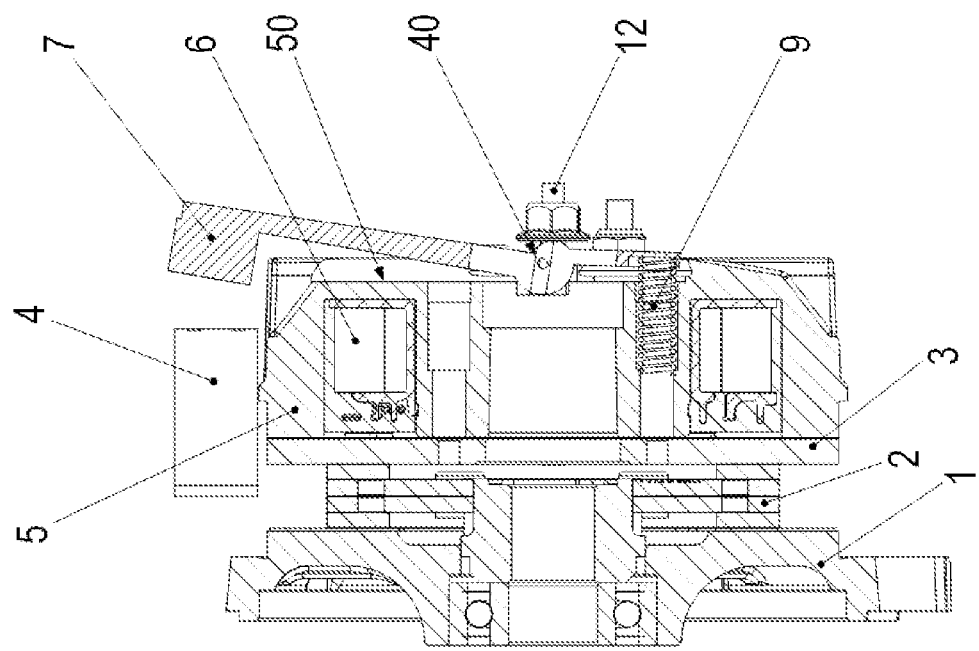
FIG. 5 is a cross-sectional view illustrating the engaged brake.

As illustrated in FIGS. 4 and 5, instead of a separate support arranged, for example, by a pin, the lever 7 itself can be formed with a pivot point disposed on the magnet body 5 and thus forming a pivot bearing.

The eccentric shape of the thickening of the lever 7 acting as the pivot point permits the pivot movement when the second electromagnet 4 is energized and thus pulls the long lever arm of the lever 7, and the spring part 9 presses on the short lever arm of the lever 7 and the armature disk 3 is pulled towards the magnet body, e.g., on the side of the magnet body facing away from the lever 7.

Thus, the lever 7 rolls along the depression as the former executes the pivot movement that occurs during the transition from the brake's released state to the brake's engaged state.

The second electromagnet has a coil core provided with a metal sheet section, and the metal sheet section is detachably connected to the magnet body 5 by a screw.

Figure 6:
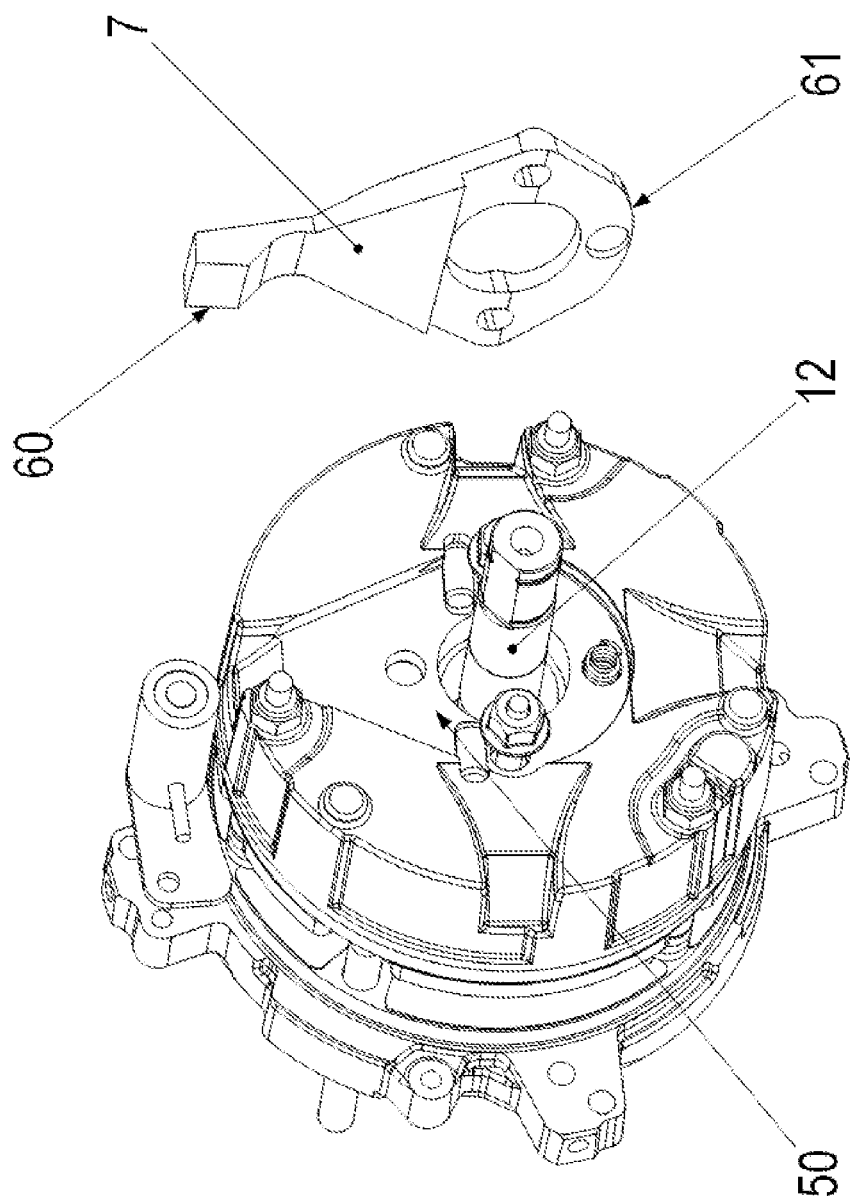
FIG. 6 is an exploded view of the lever 7 over the magnet body 5, so that a depression 50 in which the lever 7 can be received, along with its long arm 60 and its short arm, is exposed and visible.

As illustrated in FIG. 6, the magnet body 5 has a depression 50 in which at least part of the lever 7 can be received. Thus, a pivot bearing can also be formed on the magnet body 5 as a support for the lever 7.

In exemplary embodiments, when held in this manner, it is possible to deenergize the coil 6 so that losses can be reduced. The holding force of the second electromagnet 4 is sufficient.

The spring part 9 is attached in an axially oriented hole of the magnet body 5. To this end, the end region of the spring part 9 facing away from the lever 7 is connected in a positive fit to the magnet body 5. The hole through the magnet body 5 is, e.g., arranged continuous axially but as a stepped hole, and the spring part, e.g., arranged as an annular spring, is supported on a step of the stepped hole.

In example embodiments, the spring part is arranged on the side of the lever 7 facing the second electromagnet 4 and thus the spring part 9 is arranged as a compression spring rather than a tension spring, e.g., such that the long lever arm is pulled by this spring part 9.

LIST OF REFERENCE NUMERALS

1 End plate
2 Brake lining carrier
3 Armature disk
4 Second electromagnet
5 Magnet body
6 Coil
7 Lever
8 Pivot bearing
9 Spring part
10 Coil bobbin
11 Air gap
12 Rod
13 Housing part
14 Stator winding
15 Rotor shaft
16 Bearing 40 Pivot point, e.g., thickening
50 Depression, e.g., groove
60 Long lever arm
61 Short lever arm

The invention claimed is:

1. An electric motor, comprising:
an electromagnetically actuatable brake having a coil received in a magnet body;
a brake lining carrier connected, rotationally-fixed and axially displaceable, to a rotor shaft of the electric motor;
an armature disk connected, rotationally-fixed and axially displaceable, to the magnet body and arranged axially between the brake lining carrier and the magnet body;
springs supported on the magnet body and pressing on the armature disk;
a second electromagnet arranged on the magnet body the magnet body;
a lever is pivotably mounted relative to and/or on the magnet body and connected to the armature disk;
wherein, in a first rotational position of the lever, the armature disk is pressed towards the brake lining carrier, and, in a second rotational position of the lever, the armature disk is kept pulled toward the magnet body.

2. The electric motor according to claim 1, wherein the second electromagnet is detachably connected to the magnet body, the lever is rotatably mounted relative to and/or on the magnet body, the lever is connected to the armature disk by a rod, the brake is engaged in the first rotational position of the lever, the second rotational position of the lever is different than the first rotational position of the lever, and the brake is released in the second rotational position.

3. The electric motor according to claim 1, wherein the lever is arranged on a side of the magnet body facing away from the armature disk.

4. The electric motor according to claim 1, wherein an air space between the lever and a coil core of the second electromagnet disappears when the second electromagnet is energized with electrical current, or is smaller than the air space between lever and the coil core of the second electric magnet when the second electromagnet is without current.

5. The electric motor according to claim 1, wherein the lever is rotatably mounted by a support, by a roller attached directly or indirectly to the magnet body, and/or by a cylindrical pin and/or a thickening formed on the lever, and the support is arranged on the magnet body, on an outside of the magnet body, and/or on the lever.

6. The electric motor according to claim 1, the second electromagnet is adapted to hold the lever in the second rotational position by the second electromagnet and/or the second electromagnet is adapted to hold the lever in the second rotational position during energization of the second electromagnet with electrical current.

7. The electric motor according to claim 1, wherein an end plate of the electric motor is connected, secured, and/or axially and rotationally-fixedly secured to the magnet body, in the first rotational position, the brake lining carrier being pressed toward a brake surface and/or a finely machined surface arranged on the end plate.

8. The electric motor according to claim 7, wherein a brake lining of the brake lining carrier faces the end plate.

9. The electric motor according to claim 7, wherein a housing part of the electric motor that surrounds a stator winding is arranged between the end plate and a further end plate.

10. The electric motor according to claim 1, wherein a bearing rotatably mounting a rotor shaft of the electric motor is received in a first end plate.

11. The electric motor according to claim 1, wherein a relative radial distance region from the second electromagnet to a rotational axis of a rotor shaft of the electric motor is arranged radially outside a radial distance region covered by the magnet body.

12. The electric motor according to claim 1, wherein a spring part supported on the magnet body presses on the lever and/or presses the lever on a side of a support of the lever facing away from the second electromagnet.

13. The electric motor according to claim 1, wherein the lever, the armature disk, and the magnet body are made of ferromagnetic material.

14. The electric motor according to claim 1, wherein the brake lining carrier includes a brake lining axially on each of two sides.

15. The electric motor according to claim 2, wherein the rod is securely connected to the armature disk, projects through a recess passing through the magnet body, is connected to a limiting and/or to a nut screwed onto a threaded region of the rod, and is limited axially by the lever.

16. The electric motor according to claim 15, wherein the rod projects through a recess of the lever and the limiting device is connected to and/or screw-connected to the lever on a side of the lever facing away from the armature disk.

17. The electric motor according to claim 1, wherein the magnet body includes a recess and/or a recess arranged on a side of the magnet body facing away from the armature disk receiving the lever.

18. The electric motor according to claim 17, wherein the lever and/or a long arm of the lever is adapted to be pulled by magnetic leakage flux that escapes from the magnet body via a wall thickness of the magnet body thinned by means of the depression.

19. The electric motor according to claim 1, wherein the lever includes a thickening arranged as a pivot point of the lever.

20. The electric motor according to claim 19, wherein the thickening is arranged between a long lever arm and a short lever arm of the lever.

* * * * *